United States Patent
Spillman

(10) Patent No.: US 10,476,910 B2
(45) Date of Patent: Nov. 12, 2019

(54) SYSTEMS AND METHODS FOR SECURE NETWORK COMMUNICATION

(71) Applicant: MasterCard International Incorporated, Purchase, NY (US)

(72) Inventor: Gregory T. Spillman, De Soto, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 205 days.

(21) Appl. No.: 15/629,396

(22) Filed: Jun. 21, 2017

(65) Prior Publication Data
US 2018/0375898 A1 Dec. 27, 2018

(51) Int. Cl.
*H04L 29/06* (2006.01)
*H04W 12/08* (2009.01)
*H04L 12/46* (2006.01)

(52) U.S. Cl.
CPC .............. *H04L 63/20* (2013.01); *H04L 63/02* (2013.01); *H04L 63/0272* (2013.01); *H04L 63/10* (2013.01); *H04W 12/08* (2013.01); *H04L 12/4633* (2013.01); *H04L 63/104* (2013.01); *H04L 63/12* (2013.01)

(58) Field of Classification Search
CPC .................................................. H04L 63/0272
USPC ............................................................ 726/1
See application file for complete search history.

(56) References Cited

U.S. PATENT DOCUMENTS

| | | |
|---|---|---|
| 5,581,558 A | 12/1996 | Horney et al. |
| 7,653,071 B1 | 1/2010 | Pannell et al. |
| 8,111,715 B1 | 2/2012 | Pannell et al. |
| 8,984,617 B1 | 3/2015 | Fausak |
| 8,996,705 B2 | 3/2015 | Morton et al. |
| 9,094,375 B2 | 7/2015 | Branscomb |
| 9,178,715 B2 | 11/2015 | Jain et al. |
| 9,178,893 B2 | 11/2015 | Miller et al. |
| 9,219,712 B2 | 12/2015 | Paul et al. |
| 9,369,370 B2 | 6/2016 | Chow et al. |

(Continued)

FOREIGN PATENT DOCUMENTS

EP          1928127 A1        6/2008

OTHER PUBLICATIONS

PCT International Search Report and Written Opinion, Application No. PCT/US2018/031997, dated Jul. 2, 2018, 11 pps.

*Primary Examiner* — Longbit Chai
(74) *Attorney, Agent, or Firm* — Armstrong Teasdale LLP

(57) ABSTRACT

A system for secure network communications is provided. The system includes an enforcement switch in communication with a third-party device and an external device and a plurality of core devices in communication with the third-party device and a plurality of access devices. The enforcement switch is configured to receive a secure frame from the external device. The secure frame includes one or more security features. The secure frame is destined for one or more of the plurality of access devices. The enforcement switch is also configured to generate a regular frame based on the secure frame by removing the one or more security features and transmit the regular frame to the third-party device for routing to the one or more of the plurality of access devices through at least one of the plurality of core devices.

13 Claims, 5 Drawing Sheets

(56) References Cited

U.S. PATENT DOCUMENTS

2006/0112425 A1* 5/2006 Smith .................. H04L 63/20
                                                  726/13
2014/0101306 A1   4/2014  Murgia
2014/0233564 A1   8/2014  Lue et al.
2016/0294669 A1  10/2016  Chow et al.

* cited by examiner

SYSTEMS AND METHODS FOR SECURE NETWORK COMMUNICATION

BACKGROUND OF THE DISCLOSURE

The field of the disclosure relates generally to secure network communications, and more specifically to methods and systems for efficient and secure communications within a wide area network (WAN).

To access a wide area network (WAN), a series of network routers and switches (collectively referred to herein as "network devices") are used to connect user computing devices and host computing devices to the WAN. The WAN may connect devices at a plurality of remote locations and communicate through the Internet. Securing the communications between these locations is a high priority; however, in many cases this can be expensive and/or time consuming. As new computer network security technologies are developed, many of them require specialized hardware. This specialized hardware may not work with existing systems requiring computer network operators to remove potentially necessary hardware that does not interact with the specialized hardware.

BRIEF DESCRIPTION OF THE DISCLOSURE

In one aspect, a system for secure network communications is provided. The system includes an enforcement switch in communication with a third-party device and an external device and a plurality of core devices in communication with the third-party device and a plurality of access devices. The enforcement switch is configured to receive a secure frame from the external device. The secure frame includes one or more security features. The secure frame is destined for one or more of the plurality of access devices. The enforcement switch is also configured to generate a regular frame based on the secure frame by removing the one or more security features and transmit the regular frame to the third-party device for routing to the one or more of the plurality of access devices through at least one of the plurality of core devices.

In another aspect, an enforcement switch is provided. The enforcement switch is in communication with a third-party device and an external device. The enforcement switch is configured to receive a secure frame from the external device. The secure frame includes one or more security features. The secure frame is destined for one or more of a plurality of access devices. The enforcement switch is also configured to generate a regular frame based on the secure frame by removing the one or more security features and transmit the regular frame to the third-party device for routing to the one or more of the plurality of access devices In yet another aspect, a computer implemented method for secure network communications is provided. The method is implemented on an enforcement switch in communication with a third-party device and an external device. The method includes receiving a secure frame from the external device. The secure frame includes one or more security features. The secure frame is destined for one or more of the plurality of access devices. The method also includes generating a regular frame based on the secure frame by removing the one or more security features and transmitting the regular frame to the third-party device for routing to the one or more of the plurality of access devices through at least one of the plurality of core devices.

BRIEF DESCRIPTION OF THE DRAWINGS

FIG. 1 is a schematic diagram illustrating an example multi-location wide area network (WAN).

FIG. 2 is a schematic diagram illustrating a hierarchical view of the WAN shown in FIG. 1.

FIG. 3 illustrates an example configuration of network components for efficiently and securely communicating within the WAN shown in FIGS. 1 and 2.

FIG. 4 illustrates an example configuration of a client system shown in FIG. 2, in accordance with one embodiment of the present disclosure.

FIG. 5 is a flow chart of a process for efficiently and securely communicating within the WAN shown in FIGS. 1 and 2 using the network configuration shown in FIG. 3.

DETAILED DESCRIPTION OF THE DISCLOSURE

Figure 1:
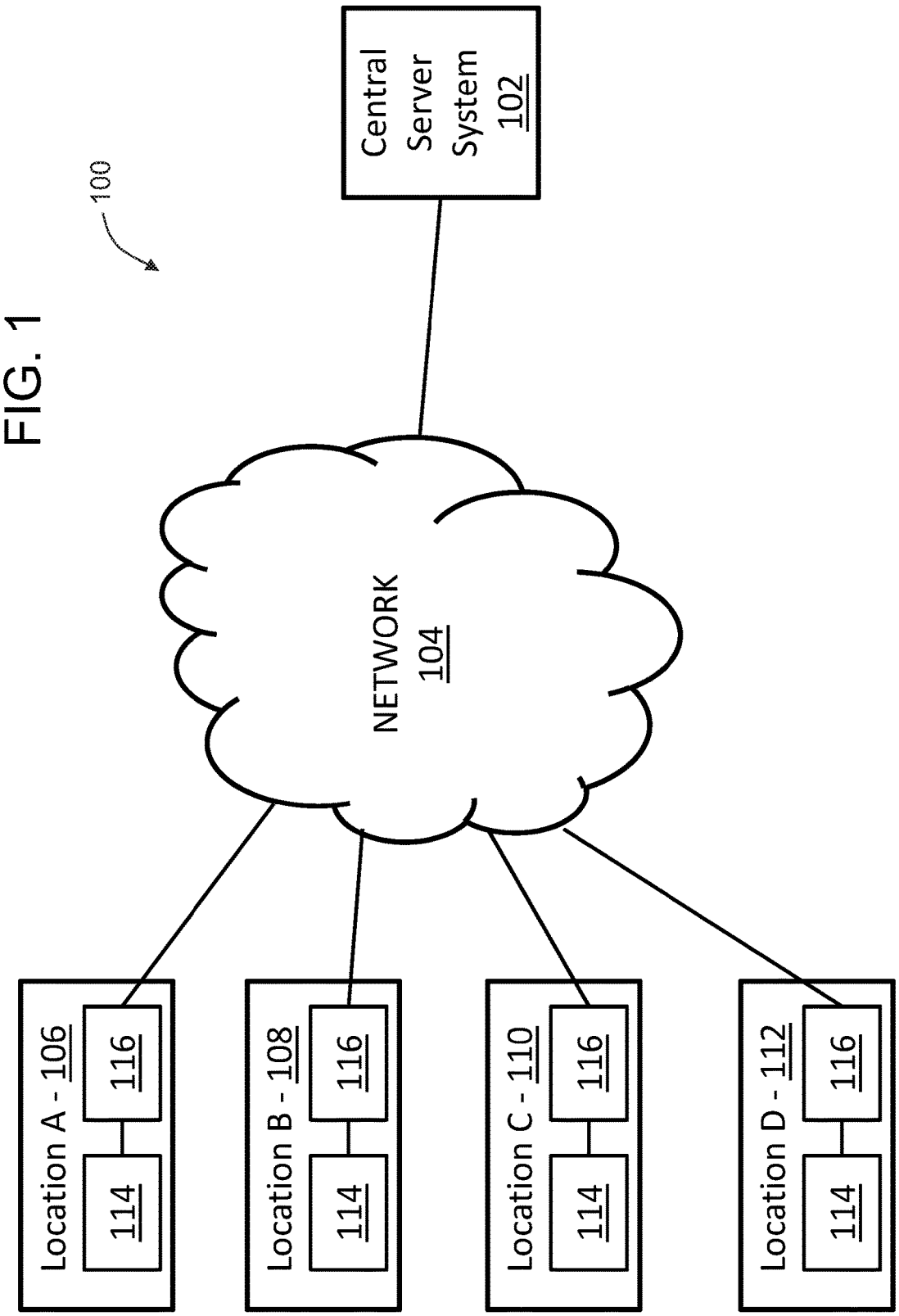
FIGS. 1-5 show example embodiments of the methods and systems described herein.

The following detailed description illustrates embodiments of the disclosure by way of example and not by way of limitation. The description clearly enables one skilled in the art to make and use the disclosure, and describes several embodiments, adaptations, variations, alternatives, and uses of the disclosure, including what is presently believed to be the best mode of carrying out the disclosure, of the system and methods to efficiently and securely communicating within a wide area network (WAN).

In the example embodiment, the WAN is in communication with a remote location. In one example, the remote location may be a central server system where the WAN supports multiple locations. In another example, the remote location is a different location supported by the WAN. In the example embodiment, a WAN router is associated with the remote location. In the example embodiment, the WAN router receives a packet from a computer device of the remote location for transmission to the WAN. The WAN router transmits an encoded packet (also known as a secure frame) to an encoder/decoder, which is a part of the WAN. In some embodiments, the encoder/decoder is also known as an enforcement switch.

In the example embodiment, the encoded packet is a modified packet that has been encoded to included security information, also known as security features. In this embodiment, the packet is based on a transport frame that uses a transport protocol. To improve the security of the transport frame, the packet is modified to include security information, such as security group tag information embedded in the header of the packet. In some embodiments, the security information is configured to be analyzed by devices of the WAN to ensure that the packet has not been tampered with. For example, the encoded packet may be an 802.1q Ethernet frame with a header that has been modified to include security information. As the header has been modified, such as by adding in additional bytes of data, normal 802.1q devices would be unable to properly process the 802.1q frame.

In the example embodiment, the packet is encoded to be in accordance with one or more security policies associated with the WAN. In some of the embodiments, the one or more security policies are managed by one or more core layer devices.

However, in the example embodiment, a third-party device, such as a WAN optimizer is a part of the WAN. The WAN optimizer is not configured to or capable of processing encoded packets. The WAN optimizer is only configured to process base packets. The encoder/decoder receives the encoded packet from the WAN router. The encoder/decoder removes the security information from the header of the packet and reforms the packet as a normal packet. The encoder/decoder transmits the normal packet to the WAN optimizer. The WAN optimizer processes the normal packet and transmits the processed packet to one or more core devices, also known as core switches.

The core device receives the processed packet. In the example embodiment, the core device reencodes the processed packet into a processed encoded packet. The processed encoded packet is routed through the network of core devices, distribution devices, and access devices to the packet's intended destination.

For example, the WAN router transmits an encoded 802.1q packet to the encoder/decoder. In this example, the encoded 802.1q packet includes a plurality of extra bytes in its header that represent security group tag information. The encoder/decoder receives the encoded 802.1q packet and removes the extra bytes from the header creating a base 802.1q packet. The encoder/decoder transmits the base 802.1q packet to the WAN optimizer. The WAN optimizer processes the base 802.1q packet and transmits the processed 802.1q packet to one or more of the core devices. The core device reencodes the processed 802.1q packet, which is then routed to the appropriate destination.

The methods and system described herein may be implemented using computer programming or engineering techniques including computer software, firmware, hardware, or any combination or subset. As disclosed above, at least one technical problem with prior systems is that there is a need for systems for consistently configuring network devices without requiring highly trained individuals to configure the devices. The system and methods described herein address that technical problem. The technical effect of the systems and processes described herein is achieved by performing at least one of the following steps: (a) forming a wide area network (WAN) to include the plurality of access devices, an enforcement switch, and a third-party device, where the third-party device is a WAN optimizer and is unable to process secure frames, and where the external device is external to the WAN; (b) receiving a secure frame from the external device, where the secure frame includes one or more security features and where the secure frame is destined for one or more of the plurality of access devices; (c) generating a regular frame based on the secure frame, where the regular frame is generated by removing the one or more security features; (d) transmitting the regular frame to the third-party device for routing to the one or more of the plurality of access devices through at least one of the plurality of core devices; (e) receiving the regular frame from the third-party device; (f) determining the one or more security features for the secure frame based on a security policy; (g) generating the secure frame based on the regular frame and the one or more security features; (h) transmitting the secure frame to the one or more of the plurality of access devices; and (i) routing the secure frame to the one or more access devices through one or more core devices and one or more distribution devices. The resulting technical effect is configuring a secure network to include third-party devices without requiring expensive and time consuming reengineering and reconstruction of the existing network.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-location wide area network (WAN) 100. WAN includes a connection between a central server system 102 and computers 114 at a plurality of locations 106, 108, 110, and 112. Central server system 102 communicates with computers 114 at plurality of locations 106, 108, 110, and 112 through a network 104. In the example embodiment, network 104 is a wide area network, such as the Internet. In other embodiments, network 104 is a company network, a payment processing network, home network, or any other wide area network where computers communicate with each other.

Each of plurality of locations 106, 108, 110, and 112 communicates to network through a network device 116. Examples of network device 116 include, but are not limited to, routers, cable modems, modems, hubs, and network switches. Network devices 116 route network traffic from network to computers 114 at each location 106, 108, 110, and 112, and vice versa. Different network devices 116 may be of different types and different capabilities. Network devices 116 at different locations 106, 108, 110, and 112 may have different connection types to network 104, which therefore provide communication with network 104 at different speeds and/or bandwidths. To communicate with network 104 properly and efficiently each network device 116 needs to be properly configured.

In the example embodiment, location A 106 is in a different geographic municipality as location B 108. Location A 106 is in a different geographic state or province as location C 110. And location A 106 is in a different geographic nation as location D 112. In other embodiments, one or more locations 106, 108, 110, and 112 may be within the same city or even the same building.

Central server system 102 communicates with computers 114 at each location 106, 108, 110, and 112. In the example embodiment, central server system 102 includes a database, such as database 220 shown in FIG. 2, that includes the configuration and capabilities of each network device 116 at each location 106, 108, 110, and 112. With this information, central server system 102 is able to configure its communication and message traffic with each network device 116 efficiently to use the capabilities of each network device 116 to the maximum efficiency possible.

Figure 2:
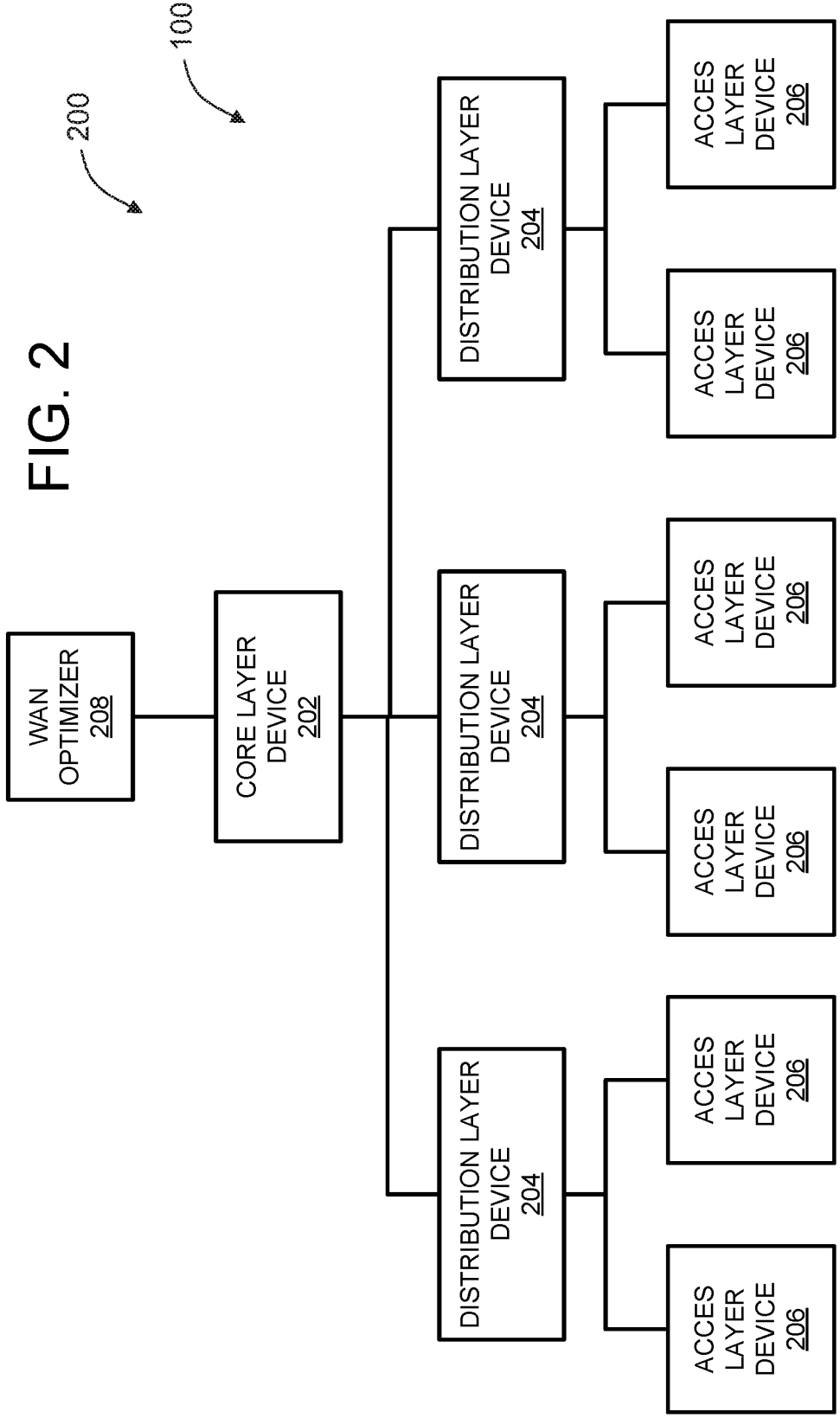

FIG. 2 is a schematic diagram 200 illustrating a hierarchical view of WAN 100 shown in FIG. 1. In the example embodiment, WAN 100 includes a plurality of devices divided into three layers, the core layer, the distribution layer, and the access layer. In some embodiments, WAN 100 includes only the core layer and the access layer.

The core layer is considered the backbone of WAN 100. The core layer is concerned with the speed of packet transmission and is configured to ensure reliable transmission and delivery of packets. The core layer includes a plurality of core layer devices 202, also known as core switches. Examples of core layer devices 202 include, but are not limited to, high-end switches, high-speed cables (such as fiber optic), multiplexers, high-speed WAN switches, private branch exchanges (PBX), and high-speed Enterprise WAN routers.

The distribution layer manages packet transmission at the local area network (LAN) level. The distribution layer ensures that packets are properly routed between subnets and virtual LANs (VLAN). The distribution layer includes a plurality of distribution layer devices 204, also known as distribution switches. Examples of distribution layer devices 204 include, but are not limited to, LAN-based routers, layer 3 switches, filters (such as firewalls), bridges, virtual private network (VPN) access routers, and Brouters.

The access layer connects client nodes, such as workstations to the network. The access layer ensures that packets are delivered to end user computers. The access layer includes a plurality of access layer devices 206, also known as access switches. Example access layer devices 206 include, but are not limited to, a desktop computer, a laptop computer, a personal digital assistant (PDA), a cellular phone, a smartphone, a tablet, a phablet, a WEB server, an FTP server, and email server, a repeater, a hub, a database server, and a switch.

In the example embodiment, WAN 100 also includes a WAN optimizer 208. WAN optimizer 208, also known as a WAN accelerator, is configured to maximize the efficiency of data flow across WAN 100. In the example embodiment, WAN optimizer 208 is configured to increase the speed of access to critical applications and information. WAN optimizer 208 performs this goal by one or more of the following techniques, traffic shaping by prioritizing and allocating bandwidth as needed; data deduplication by reducing the data that must be sent across WAN 100 for remote backups, replication, and disaster recovery; data compression to shrinks the size of data to limit bandwidth use; data caching frequently used data on a local server for faster access; monitoring the network to detect non-essential traffic; creating and enforcing rules about downloads and Internet use; and protocol spoofing by bundling protocols into a single protocol. In the example embodiment, WAN optimizer 208 may use some or all of the above techniques.

Figure 3:
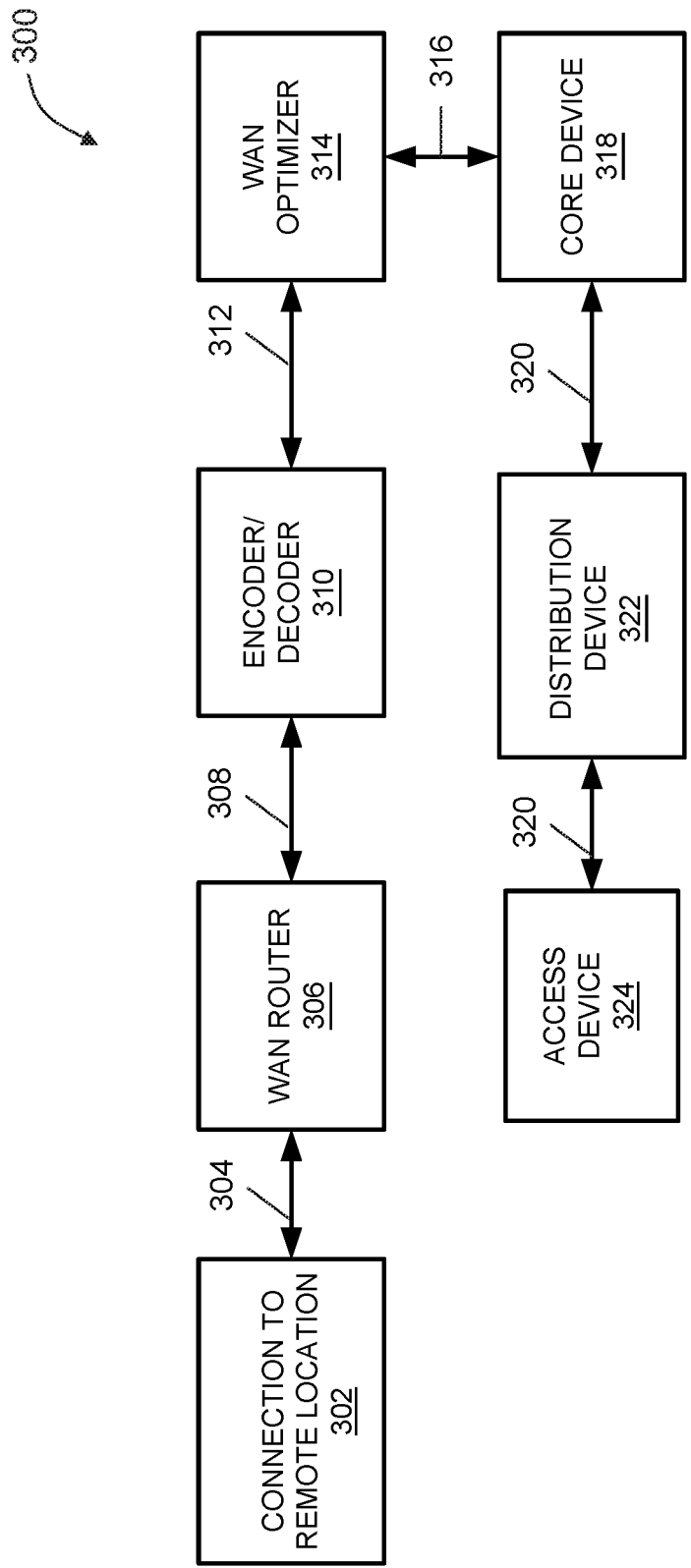

FIG. 3 illustrates an example configuration 300 of network components for efficiently and securely communicating within WAN 100 shown in FIGS. 1 and 2.

In the example embodiment, WAN 100 is in communication with a remote location 302. In one example, remote location 302 may be central server system 102 (shown in FIG. 1). In another example, remote location 302 is one of Location A 106, Location B 108, Location C 110, and Location D 112 (all shown in FIG. 1). In the example embodiment, WAN router 306 is associated with the remote location 302. In the example embodiment, WAN router 306 receives a packet 304 from remote location 302 for transmission to WAN 100. WAN router 306 transmits an encoded packet 308 (also known as a secure frame) to encoder/decoder 310, which is a part of WAN 100. In some embodiments, encoder/decoder 310 is also known as an enforcement switch.

In the example embodiment, encoded packet 308 is a modified packet that has been encoded to included security information, also known as security features. In this embodiment, the packet is based on a transport frame that uses a transport protocol. To improve the security of the transport frame, the packet is modified to include security information, such as security group tag information embedded in the header of the packet. In some embodiments, the security information is configured to be analyzed by devices of WAN 100 to determine or ensure that the packet is permitted on the network. The packet will be blocked from entering the network if encoder/decoder 310 determines that it is not permitted and allowed if encoder/decoder 310 determines that it is allowed. For example, encoded packet 308 may be an 802.1q Ethernet frame with a header that has been modified to include security information. As the header has been modified, such as by adding in additional bytes of data, normal 802.1q devices would be unable to properly process the 802.1q frame.

In the example embodiment, the packet is encoded to be in accordance with one or more security policies associated with WAN 100. Encoder/decoder 310 may analyze the packet based on the security policy. In some of the embodiments, the one or more security policies are managed by one or more core layer devices 202 (shown in FIG. 2).

However, in the example embodiment, a third-party device, such as WAN optimizer 314, which is similar to WAN optimizer 208 (shown in FIG. 2), is a part of WAN 100. WAN optimizer 314 is not configured to process encoded packets 308. WAN optimizer 314 is only configured to process base packets. Encoder/decoder 310 receives encoded packet 308 from WAN router 304. Encoder/decoder 310 analyzes encoded packet 308 in view of one or more security policies and processes encoded packet 308 if encoded packet 308 complies with the security policies. Packets that do not comply with the security policies are dropped rather than being processed as described in the following steps. Encoder/decoder 310 removes the security information from the header of the packet and reforms the packet as a normal packet 312. Encoder/decoder 310 transmits normal packet 312 to WAN optimizer 314. WAN optimizer 314 processes normal packet 312 and transmits processed packet 316 to one or more core devices 318. In the example embodiment, core devices 318 are similar to core layer devices 302. In some embodiments, encoder/decoder 310 is in communication Core device 318 receives processed packet 316. In the example embodiment, core device 318 reencodes processed packet 316 into processed encoded packet 320. Processed encoded packet 320 is routed through the network of core devices 318, distribution devices 322, and access devices 324 to the packet's destination.

For example, WAN router 306 transmits an encoded 802.1q packet 308 to encoder/decoder 310. In this example, the encoded 802.1q packet 308 includes a plurality of extra bytes in its header that represent security group tag information. Encoder/decoder 310 receives the encoded 802.1q packet 308 and removes the extra bytes from the header creating a base 802.1q packet 312. Encoder/decoder 310 transmits the base 802.1q packet 312 to WAN optimizer 314. WAN optimizer 314 processes the base 802.1q packet 312 and transmits the processed 802.1q packet 316 to one or more core devices 318. The core devices 318 reencode the processed 802.1q packet 316, which is then routed to the appropriate destination.

Figure 4:
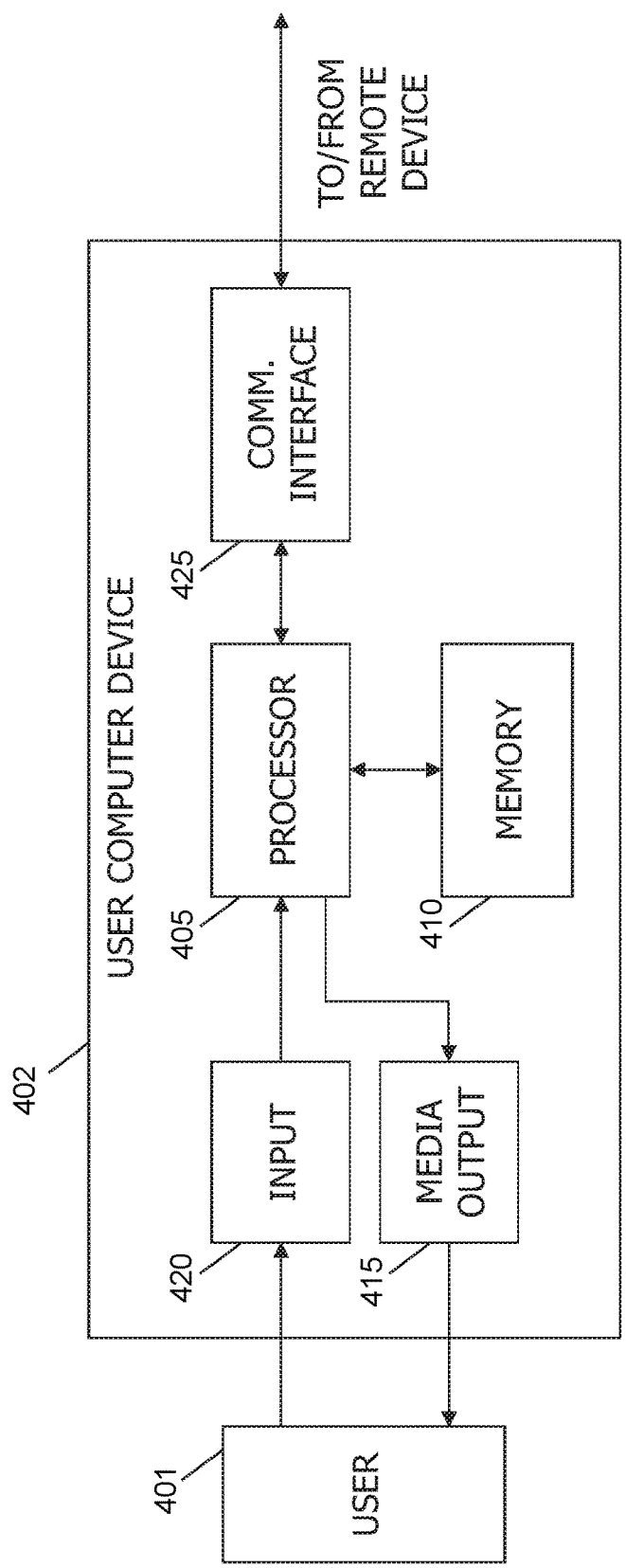

FIG. 4 illustrates an example configuration of a client system shown in FIG. 2, in accordance with one embodiment of the present disclosure. User computer device 402 is operated by a user 401. User computer device 402 may include, but is not limited to, access layer device 206 (shown in FIG. 2). User computer device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or transaction data to be stored and retrieved. Memory area 410 may include one or more computer-readable media.

User computer device 402 also includes at least one media output component 415 for presenting information to user 401. Media output component 415 is any component capable of conveying information to user 401. In some embodiments, media output component 415 includes an output adapter (not shown) such as a video adapter and/or an audio adapter. An output adapter is operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 415 is configured to present a graphical user interface (e.g., a web browser and/or a client application) to user 401. A graphical user interface may include, for example, a utility for retrieving data from remote locations. In some embodiments, user computer device 402 includes an input device 320 for receiving input from user 401. User 401 may use input device 420 to, without limitation, select and/or enter one or more answers to a configuration questionnaire. Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as another access layer device 206, distribution layer device 204, core layer device 202 (both shown in FIG. 2), and central server system 102 (shown in FIG. 1). Communication interface 425 may include, for example, a wired or wireless network adapter and/or a wireless data transceiver for use with a mobile telecommunications network.

Stored in memory area 410 are, for example, computer-readable instructions for providing a user interface to user 401 via media output component 415 and, optionally, receiving and processing input from input device 420. The user interface may include, among other possibilities, a web browser and/or a client application. Web browsers enable users, such as user 401, to display and interact with media and other information typically embedded on a web page or a website. A client application allows user 401 to interact with, for example, a remote location. For example, instructions may be stored by a cloud service and the output of the execution of the instructions sent to the media output component 415.

Figure 5:
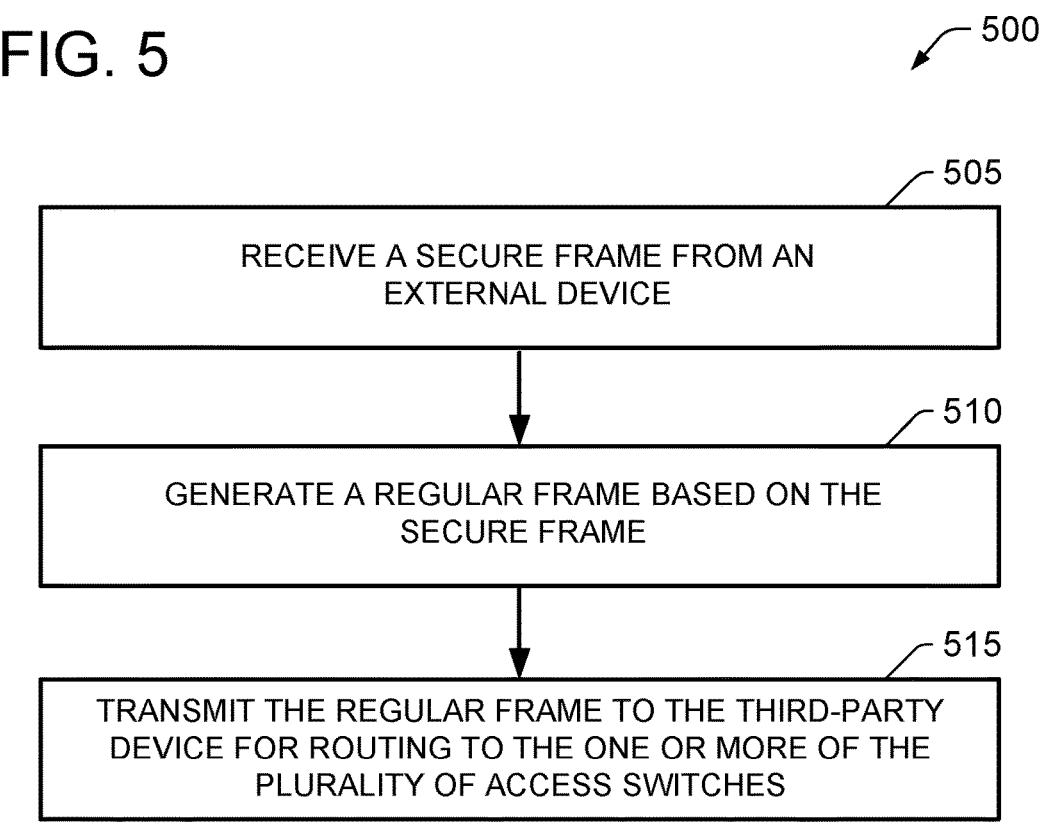

FIG. 5 is a flow chart of a process for efficiently and securely communicating within WAN 100 (shown in FIGS. 1 and 2) using network configuration 300 (shown in FIG. 3). In the example embodiment, process 500 is performed by encoder/decoder 310 (shown in FIG. 3).

In the example embodiment, encoder/decoder 310 receives 505 a secure frame 308 (shown in FIG. 3) from a remote device, such as WAN router 306 (shown in FIG. 3). Secure frame 308 includes one or more security features, such as security information integrated into secure frame's header. Secure frame is destined for one or more of a plurality of access devices 324 (shown in FIG. 3), also known as access devices.

In the example embodiment, encoder/decoder 310 generates 510 a regular frame 312 based on the secure frame 308 by removing the one or more security features (also known as security information). Encoder/decoder 310 transmits 515 the regular frame 312 to a third-party device, such as WAN optimizer 314 (shown in FIG. 3) for routing to the one or more of the plurality of access devices 324 through at least one of the plurality of core devices 318 (shown in FIG. 3).

In some embodiments, core device 318 is configured to receive the regular frame 312 from the third-party device. Core device 318 then generates a secure frame 320 (shown in FIG. 3) from the regular frame 312. Core device 318 then transmits the secure frame 320 to one or more of the plurality of access devices 322. In some further embodiments, core device 318 is further configured to determine the one or more security features for secure frame 320 based on a security policy. In some embodiments, core device 318 stores the security policy. In other embodiments, core device 318 accesses the security policy from a separate device, such as a separate server.

In some embodiments, encoder/decoder 310 also stores and/or access the security policy. Encoder/decoder 310 analyzes the security features of secure frame 308 to ensure the security of the packet prior to transmitting to WAN optimizer 314.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal languages of the claims.

What is claimed is:

1. A system for secure and efficient network communications within a wide area network (WAN) comprising:
   an enforcement switch in communication with a third-party device and a WAN router, the WAN router in communication with an external device, wherein the external device is located remotely from the enforcement switch and is external to the WAN and wherein the third-party device is a WAN optimizer and is unable to process secure frames; and
   a plurality of core devices in communication with the third-party device and a plurality of access devices, wherein each access device of the plurality of access devices is configured to receive the secure frames and deliver the secure frames to end users using the plurality of access devices,
   wherein the enforcement switch is configured to:
      receive a secure frame from the external device via the WAN router, wherein the secure frame includes one or more security features and wherein the secure frame is destined for one or more of the plurality of access devices;
      generate a regular frame based on the secure frame in response to determining that the secure frame complies with a security policy, wherein the regular frame is generated by removing the one or more security features; and
      transmit the regular frame to the third-party device, wherein the third-party device is configured to: (i) determine optimal routing of the regular frame to the one or more of the plurality of access devices by identifying one or more core devices of the at least one of the plurality of core devices and (ii) transmit the regular frame to the identified one or more core devices of the at least one of the plurality of core devices.

2. A system in accordance with claim 1, wherein each core device of the plurality of core devices is configured to:
   receive the regular frame from the third-party device;
   generate a re-secured frame based on the regular frame, wherein the re-secured frame is generated by adding the one or more security features; and
   transmit the re-secured frame to the one or more of the plurality of access devices.

3. A system in accordance with claim 2, wherein each core device stores a security policy, and wherein the core device is configured to:
   determine the one or more security features for the re-secured frame based on the security policy; and
   generate the re-secured frame based on the regular frame and the one or more security features.

4. A system in accordance with claim 2, wherein the core device is further configured to route the re-secured frame to the one or more of the plurality of access devices through one or more distribution devices.

5. A system in accordance with claim 1, wherein the enforcement switch stores the security policy, and wherein the enforcement switch is programmed to:
   if the determination is that the secure frame complies with the security policy, decode and transmit the secure frame; and
   if the determination is that the secure frame does not comply with the security policy, drop the secure frame and prevent further transmission of the secure frame.

6. A system in accordance with claim 1, wherein the plurality of core devices and the plurality of access devices form a wide area network (WAN) network.

7. An enforcement switch in communication with a third-party device and a wide area network (WAN) router for assuring secure and efficient network communications within a wide area network, wherein the WAN router in communication with an external device that is located in a remote location from the enforcement switch and is external to the WAN and wherein the third-party device is a WAN optimizer and is unable to process secure frames, and wherein the enforcement switch is configured to:

receive a secure frame from the external device via the WAN router, wherein the secure frame includes one or more security features and wherein the secure frame is destined for one or more of a plurality of access devices;

determine whether the secure frame complies with a security policy;

if the determination is that the secure frame complies, decode and transmit the secure frame; and if the determination is that the secure frame does not comply, drop the secure frame and prevent further transmission of the secure frame;

if the determination is that the secure frame complies, enforcement switch is configured to:

generate a regular frame based on the secure frame, wherein the regular frame is generated by removing the one or more security features; and transmit the regular frame to the third-party device, wherein the third-party device is configured to determine optimal routing of the regular frame to the one or more of the plurality of access devices by identifying one or more core devices and transmitting the regular frame to the identified one or more core devices.

8. A computer implemented method for secure and efficient network communications within a wide area network (WAN), said method implemented on an enforcement switch in communication with a third-party device and a WAN router, the WAN router in communication with an external device, wherein the external device is located remotely from the enforcement switch and is external to the WAN and wherein the third-party device is a WAN optimizer and is unable to process secure frames, said method comprising:

receiving a secure frame from the external device via the WAN router, wherein the secure frame includes one or more security features and wherein the secure frame is destined for one or more of a plurality of access devices, wherein each access device of the plurality of access devices is configured to receive the secure frames and deliver the secure frames to end users of the plurality of access devices;

generating, by the enforcement switch, a regular frame based on the secure frame in response to determining that the secure frame complies with a security policy, wherein the regular frame is generated by removing the one or more security features; and transmitting, by the enforcement switch, the regular frame to the third-party device, wherein the third- party device is configured to: (i) determine optimal routing of the regular frame to the one or more of the plurality of access devices by identifying one or more core devices of at least one of a plurality of core devices and (ii) transmit the regular frame to the identified one or more core devices of the at least one of a plurality of core devices.

9. A method in accordance with claim 8 further comprising:

receiving the regular frame from the third-party device;

generating a re-secured frame based on the regular frame, wherein the re-secured frame is generated by adding the one or more security features; and transmitting the re-secured frame to the one or more of the plurality of access devices.

10. A method in accordance with claim 9 further comprising:

determining the one or more security features for the re-secured frame based on a security policy; and generating the re-secured frame based on the regular frame and the one or more security features.

11. A method in accordance with claim 8, wherein the enforcement switch stores the security policy, and wherein determining that the secure frame complies with the security policy further comprises:

if the determination is that the secure frame complies with the security policy, decoding and transmitting the secure frame; and if the determination is that the secure frame does not comply with the security policy, dropping the secure frame and prevent further transmission of the secure frame, and the method further comprising routing the secure frame to the one or more of the plurality of access devices through the one or more core devices of the at least one of the plurality of core devices.

12. A method in accordance with claim 11 further comprising routing the secure frame to the one or more of the plurality of access devices through one or more distribution devices.

13. A method in accordance with claim 8 further comprising forming a wide area network (WAN) to include the plurality of access devices, the enforcement switch, and the third-party device.

* * * * *